M. C. SMYTH.
DRIP PAN.
APPLICATION FILED APR. 12, 1909.
935,278.
Patented Sept. 28, 1909.
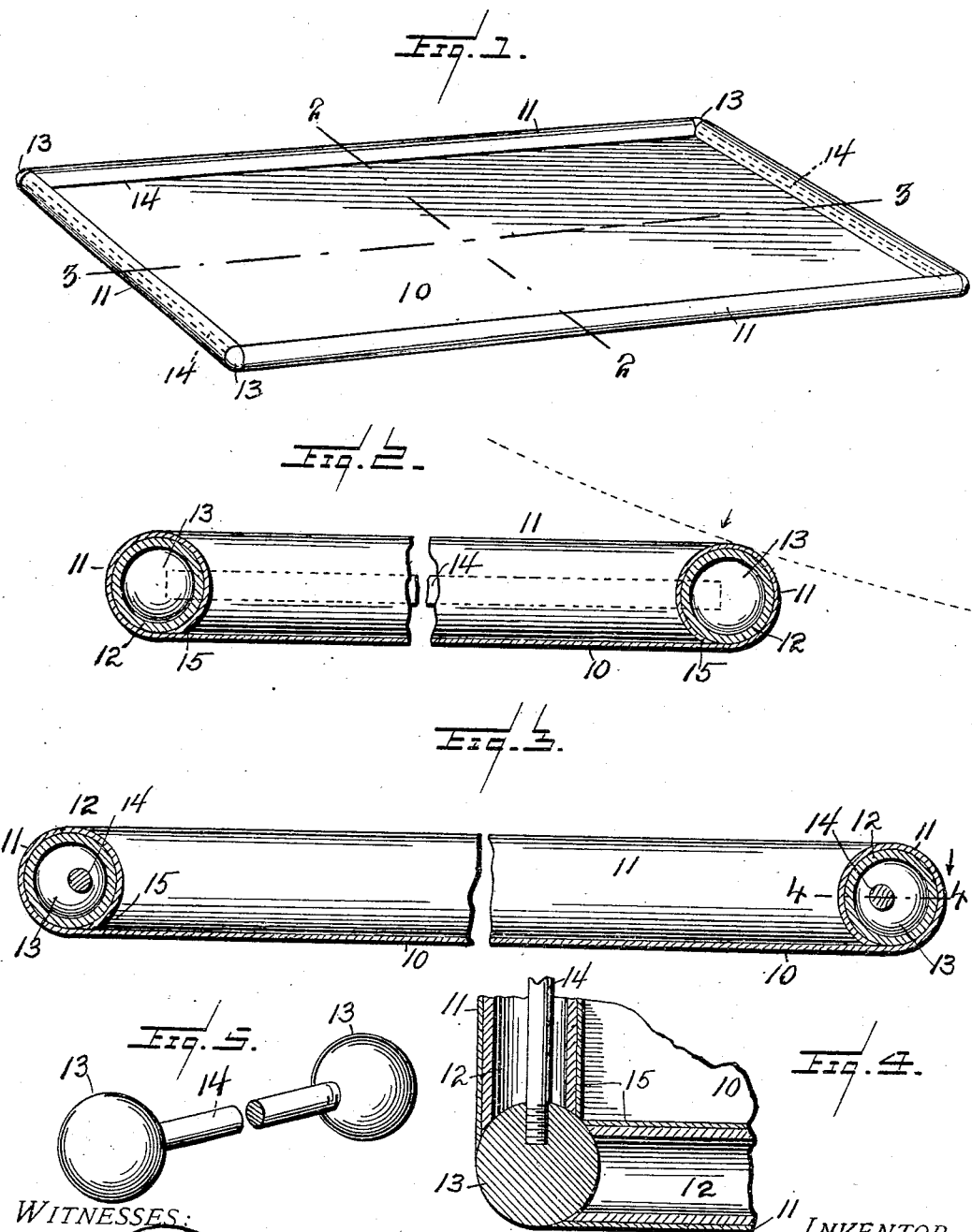
WITNESSES:
INVENTOR
Muir C. Smyth.
BY
Attorney

UNITED STATES PATENT OFFICE.

MUIR C. SMYTH, OF BELLPORT, NEW YORK.

DRIP-PAN.

935,278.  Specification of Letters Patent.  Patented Sept. 28, 1909.

Application filed April 12, 1909. Serial No. 489,518.

*To all whom it may concern:*

Be it known that I, MUIR C. SMYTH, citizen of the United States, residing at Bellport, county of Suffolk, and State of New York, have invented certain new and useful Improvements in Drip-Pans, of which the following is a specification, reference being had therein to the accompanying drawing.

This invention relates to a drip pan, and particularly to a structure adapted for use in connection with motor vehicles.

The invention has for an object to provide a metallic pan having its edges or flanges reinforced from the body of the pan upward so that the contact of a wheel therewith will not injure the pan nor tire and will not move the pan from its position as the pressure is downward upon the flanges thereof.

Other and further objects and advantages of the invention will be hereinafter fully set forth and the novel features thereof defined by the appended claims.

In the drawing:—Figure 1 is a perspective of the invention; Fig. 2 is an enlarged vertical section on line 2—2 Fig. 1; Fig. 3 is a similar view on line 3—3 Fig. 1; Fig. 4 is a horizontal section on line 4—4 Fig. 3; Fig. 5 is a detail perspective of the corner balls.

The numeral 10 designates the body of the pan which may be of any desired size or configuration and is preferably formed of metal and its edges curved or rounded upward to form flanges 11 in order to retain the drippings or contents of the pan. These edges are reinforced or supported by any desired form of filler such as a tube, as shown at 12 so as to prevent compression or injury to the flanges when the weight of a vehicle is placed thereon due to the wheel passing over the edges of the pan. This reinforcement extends upward from the bottom of the pan to the height of the edge flanges so as to produce a solid noncompressible flange about the edges of the pan.

The corners where the tubes or reinforcing members intersect each other may be finished in any desired manner, a preferable structure being the use of a ball 13 seated in the adjacent ends of the pipe or tubing and suitably secured thereto. These balls may be connected together by a rod 14 threaded therein and extending through the tubes at the ends of the pan. The rolled or overturned edge of the bottom which embraces the reinforcing member may be continued into contact with the bottom, as shown at 15 in Figs. 2 and 3 and there secured by soldering or otherwise so as to effect a liquid tight joint at the edges of the pan, and the corners at the inner side of the ball may be similarly held to prevent the escape of oil or other drippings from the pan.

In the use of the ordinary drip pan in connection with motor vehicles it is found that the wheels often pass over the flanged edges of the pan and the weight of the vehicle crushes or bends the flanges so as to injure or destroy the pan, and the present invention seeks to provide a reinforcement for these edges extending upward from the bottom of the pan so as to support the weight of the vehicle when the wheel thereof contacts with the flange or rides thereover so that an automobile may be driven directly over the pan without injury thereto. The curved formation of the edge flange assists in preventing injury thereto and also prevents slipping of the pan if struck by the wheel as the pressure of the tire thereon is downward as indicated by dotted lines in Fig. 2 and the tendency of such contact is to retain the pan in position as it offers no resistance to the vehicle passing over the pan. This also prevents tipping of the pan when the flange thereof is struck by a wheel.

It will therefore be seen that the invention presents a simple, efficient and economically constructed drip pan especially adapted for use and application in connection with motor vehicles.

Having described my invention and set forth its merits, what I claim and desire to secure by Letters Patent is:—

1. A drip pan comprising a sheet metal bottom having upturned edge flanges terminating at each side of the corners of the pan, reinforcing members extended from the pan bottom to the top of said flanges, and corner members seated in the adjacent ends of said flanges and disposed intermediate of said ends.

2. A drip pan comprising a sheet metal bottom and edge flanges, tubular reinforcing members in said flanges, and spherical corner connections between said reinforcing members.

3. A drip pan comprising a sheet metal bottom and edge flanges, tubular reinforcing members in said flanges, spherical corner connections between said reinforcing members, and a rod extending through said tubular members and connecting the spherical corners at the opposite ends thereof.

4. In a drip pan, a sheet metal bottom having rolled side flanges, a tubular reinforcement disposed in said flanges and extending for the height thereof, and balls connected to each other and seated in the adjacent ends of said reinforcement at the corners of the pan to form a joint therefor.

In testimony whereof I affix my signature in presence of two witnesses.

MUIR C. SMYTH.

Witnesses:
CHRISTOPHER TAPPAN,
LOUIS WEIDNER.